United States Patent
Wang

(10) Patent No.: US 12,479,427 B2
(45) Date of Patent: Nov. 25, 2025

(54) LANE DEPARTURE SUPPRESSION DEVICE

(71) Applicant: TOYOTA JIDOSHA KABUSHIKI KAISHA, Toyota (JP)

(72) Inventor: Chenyu Wang, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 284 days.

(21) Appl. No.: 18/207,530

(22) Filed: Jun. 8, 2023

(65) Prior Publication Data

US 2024/0067173 A1 Feb. 29, 2024

(30) Foreign Application Priority Data

Aug. 24, 2022 (JP) ................. 2022-132906

(51) Int. Cl.
*B60W 30/12* (2020.01)
*B60W 50/14* (2020.01)
*B60W 50/16* (2020.01)

(52) U.S. Cl.
CPC ............ *B60W 30/12* (2013.01); *B60W 50/16* (2013.01); *B60W 2050/143* (2013.01); *B60W 2050/146* (2013.01); *B60W 2300/14* (2013.01); *B60W 2520/22* (2013.01); *B60W 2530/205* (2020.02)

(58) Field of Classification Search
CPC ..... B60W 2050/143; B60W 2050/146; B60W 2300/14; B60W 2520/22; B60W 2530/203; B60W 2530/205; B60W 2552/53; B60W 2554/802; B60W 30/12; B60W 50/14
See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,714,034 B2 | 7/2017 | Otake et al. | |
| 9,880,558 B2 | 1/2018 | Nakamura et al. | |
| 9,902,399 B2 | 2/2018 | Torii et al. | |
| 10,345,443 B2 | 7/2019 | Masui et al. | |
| 10,611,240 B2 | 4/2020 | Masui et al. | |
| 2016/0167651 A1* | 6/2016 | Schwindt | B62D 13/06 382/104 |
| 2018/0068566 A1* | 3/2018 | Prasad | G08G 1/167 |
| 2021/0078572 A1* | 3/2021 | Kim | B60W 30/12 |

FOREIGN PATENT DOCUMENTS

| | | |
|---|---|---|
| JP | 2019-026209 A | 2/2019 |
| JP | 2019-156059 A | 9/2019 |

* cited by examiner

*Primary Examiner* — Charles J Han
(74) *Attorney, Agent, or Firm* — Sughrue Mion, PLLC

(57) ABSTRACT

A lane departure suppression device includes an object information acquisition device that acquires information on an object around a vehicle, and a control unit that executes, when determination is made that there is a possibility that the vehicle crosses a departure determination reference line based on information acquired by the object information acquisition device, lane departure suppression control such that the possibility is reduced. The control unit is configured to change the departure determination reference line such that determination is made more easily that there is the possibility when the vehicle is towing a trailer than when the vehicle is not towing the trailer.

5 Claims, 5 Drawing Sheets

LANE DEPARTURE SUPPRESSION DEVICE

CROSS-REFERENCE TO RELATED APPLICATION

This application claims priority to Japanese Patent Application No. 2022-132906 filed on Aug. 24, 2022, incorporated herein by reference in its entirety.

BACKGROUND

1. Technical Field

The present disclosure relates to a lane departure suppression device for a vehicle such as an automobile.

2. Description of Related Art

A lane departure suppression device detects a position of a vehicle with respect to a lane, and executes lane departure suppression control of at least one of issuing of a warning and automatic turning of a turning wheel when it is determined that there is a possibility that the vehicle departs from the lane based on the detected position of the vehicle.

The vehicle may tow a trailer, and when the vehicle tows the trailer, the vehicle makes a larger turn when traveling around a curve than when the vehicle does not tow the trailer. Therefore, as described in Japanese Unexamined Patent Application Publication No. 2019-156059 (JP 2019-156059 A) below, for example, the lane departure suppression device is known in which when the vehicle tows the trailer and travels around the curve, the lane departure tolerance on the outside of the curve is calculated, and the departure up to the departure tolerance is allowed to execute the lane departure suppression control.

SUMMARY

When a vehicle tows a trailer, depending on the size of the trailer, the trailer may depart from the lane even when the vehicle does not depart from the lane. In the conventional lane departure suppression device as described above, since lane departure suppression control is executed without considering the size of the trailer, the possibility that the trailer departs from the lane cannot be effectively reduced.

The present disclosure provides a lane departure suppression device that can reduce the possibility that the vehicle and the trailer depart from the lane more effectively as compared with the past by determining the possibility that the vehicle and the trailer depart from the lane in consideration of the size of the trailer.

According to the present disclosure, a lane departure suppression device (100) including an object information acquisition device (13) that acquires information on an object around a vehicle (60), and a control unit (LDA/ECU 10) that executes, when determination is made that there is a possibility that the vehicle crosses a departure determination reference line (76) based on information acquired by the object information acquisition device, lane departure suppression control such that the possibility is reduced (S100) is provided.

The control unit (LDA/ECU 10) is configured to change the departure determination reference line (76) such that determination is made more easily that there is the possibility when the vehicle (60) is towing a trailer (80) than when the vehicle is not towing the trailer.

According to the above configuration, the departure determination reference line is changed such that determination is made more easily that there is the possibility when the vehicle is towing the trailer than when the vehicle is not towing the trailer. Therefore, since determination is made more easily that there is the possibility, the lane departure suppression control can be executed earlier when the vehicle is towing the trailer than when the vehicle is not towing the trailer. Therefore, it is possible to effectively reduce the possibility of the vehicle and the trailer departing from the lane.

In one aspect of the present disclosure, when a width (W2) of the trailer (80) is greater than a width (W1) of the vehicle (60) (S60), the control unit (LDA/ECU 10) is configured to change the departure determination reference line such that the departure determination reference line (76) approaches a center of a lane (64) as a difference between the two widths is large (S80).

According to the above aspect, when the width of the trailer is greater than the width of the vehicle, the departure determination reference line is changed so as to approach the center of the lane as the difference between the two widths is large. Therefore, it can be determined more easily that the vehicle and the trailer may cross the departure determination reference line as compared with a case when the departure determination reference line is not changed so as to approach the center of the lane as the difference between the two widths is large.

The departure determination reference line may be changed so as to approach the center of the lane by, for example, one-half of the difference between the two widths.

In another aspect of the present disclosure, the control unit (LDA/ECU 10) is configured to execute the lane departure suppression control (S130) such that the vehicle is suppressed from approaching the departure determination reference line when determination is made that another vehicle is present in a predetermined area (70) positioned rearward of the vehicle on a side of the departure determination reference line based on the information acquired by the object information acquisition device (13) in a situation where the vehicle (60) is towing the trailer (80) and is approaching the departure determination reference line (76).

According to the aspect, the lane departure suppression control is executed such that the vehicle is suppressed from approaching the departure determination reference line when determination is made that another vehicle is present in the predetermined area positioned rearward of the vehicle on a side of the departure determination reference line based on the information acquired by the object information acquisition device in a situation where the vehicle is towing the trailer and is approaching the departure determination reference line.

Therefore, since it is possible to suppress the vehicle towing the trailer from moving in the direction approaching the departure determination reference line, it is possible to reduce the possibility of the vehicle and the trailer colliding with the other vehicle being present in the predetermined area as compared with a case where the vehicle is not suppressed from approaching the departure determination reference line.

In another aspect of the present disclosure, the control unit (LDA/ECU 10) is configured to variably set a length of the predetermined area based on a length of the trailer (S50) such that the length (Lp) of the predetermined area (70) increases as the length (L2) of the trailer increases.

According to the above aspect, the length of the predetermined area is variably set based on the length of the trailer such that the length of the predetermined area increases as the length of the trailer increases. Therefore, as compared with a case where the length of the predetermined area is constant, even when the length of the trailer is long, it is possible to reduce the possibility of the vehicle and the trailer colliding with the other vehicle being present in the predetermined area.

In another aspect of the present disclosure, the control unit (LDA/ECU 10) is configured to specify a positional relationship of a front end corner portion and a rear end corner portion of the trailer (80) with respect to the vehicle based on the information acquired by the object information acquisition device (13) when the vehicle (60) travels by towing the trailer (80), and calculate a width (W2) and the length (L2) of the trailer based on the positional relationship (S230 to S290).

According to the above aspect, based on the information acquired by the object information acquisition device when the vehicle travels by towing the trailer, the positional relationship of the front end corner portion and the rear end corner portion of the trailer with respect to the vehicle is specified, and the width and the length of the trailer are calculated based on the positional relationship. Therefore, information on the width and the length of the trailer can be acquired based on the information acquired by the object information acquisition device, and the necessity of acquiring the information on the width and the length of the trailer before the vehicle starts traveling by towing the trailer can be eliminated.

In the above description, in order to help understanding of the present disclosure, the names and/or the reference signs used in the embodiment are added in parentheses to the configurations of the disclosure corresponding to the embodiment to be described later. However, each component of the present disclosure is not limited to the component of the embodiment corresponding to the name and/or the reference sign attached in parentheses. Other objects, other features and accompanying advantages of the present disclosure will be readily understood from the description of embodiments of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A lane departure suppression device according to an embodiment of the present disclosure will be described in detail with reference to the accompanying drawing.

Configuration

Figure 1:
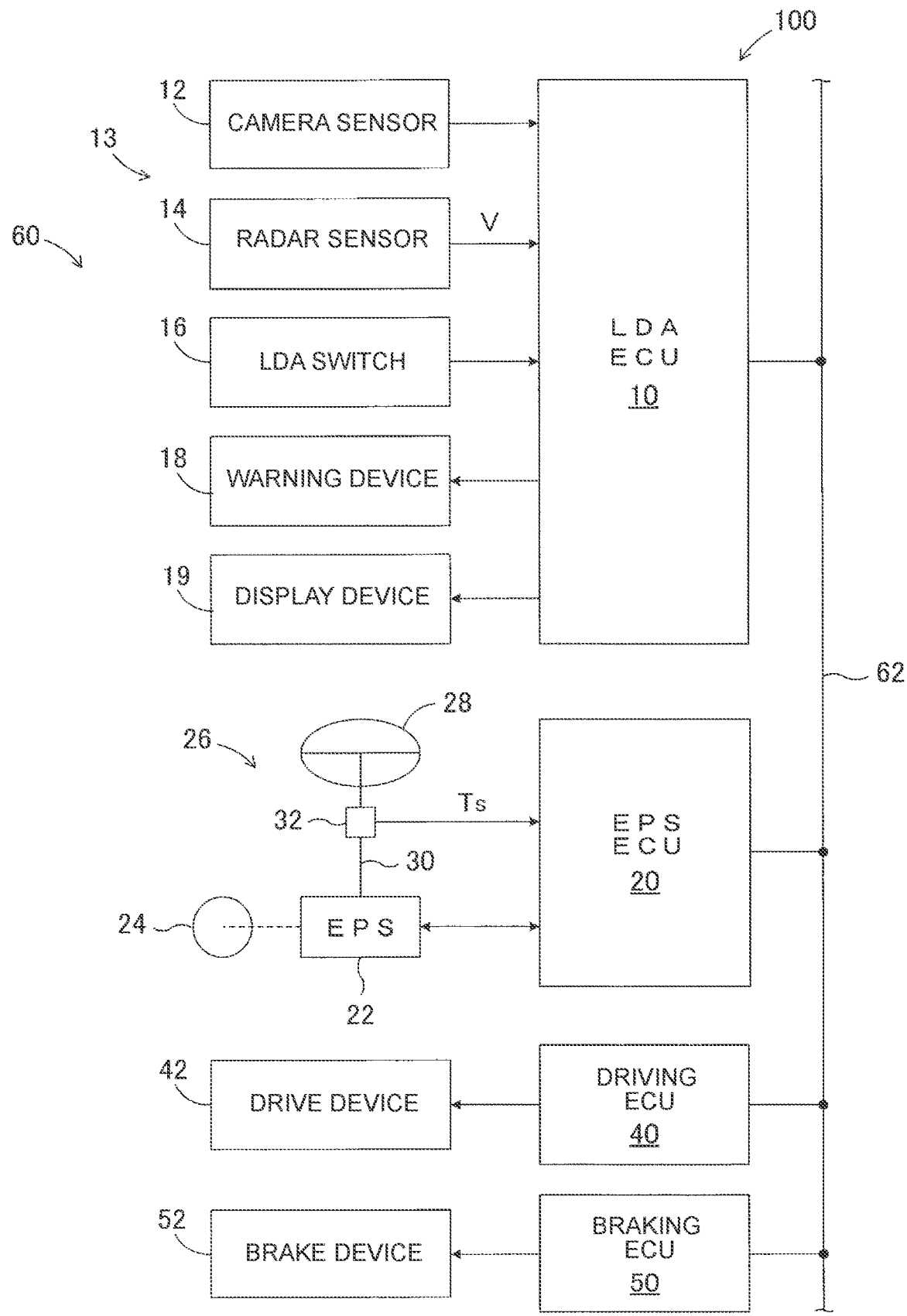
FIG. 1 is a schematic configuration diagram showing an embodiment of a lane departure suppression device according to the present disclosure.

As shown in FIG. 1, a lane departure suppression device 100 according to the embodiment is applied to a vehicle 60, and includes a lane departure suppression ECU 10, an electric power steering ECU 20, a driving ECU 40, and a braking ECU 50. In the present specification, lane departure suppression is referred to as an LDA (an abbreviation of lane departure alert with control) as necessary, and electric power steering is referred to as an EPS (an abbreviation of electric power steering) as necessary.

These ECUs are electric control units each including a microcomputer as a main unit, and are connected to each other so as to be able to transmit and receive information via a controller area network (CAN) 62. Each of the microcomputers includes a central processing unit (CPU), a read-only memory (ROM), a random access memory (RAM), a non-volatile memory, an interface, and the like. The CPU realizes various functions by executing instructions (programs, routines) stored in the ROM. Some or all of these ECUs may be integrated into one ECU.

Figure 2:
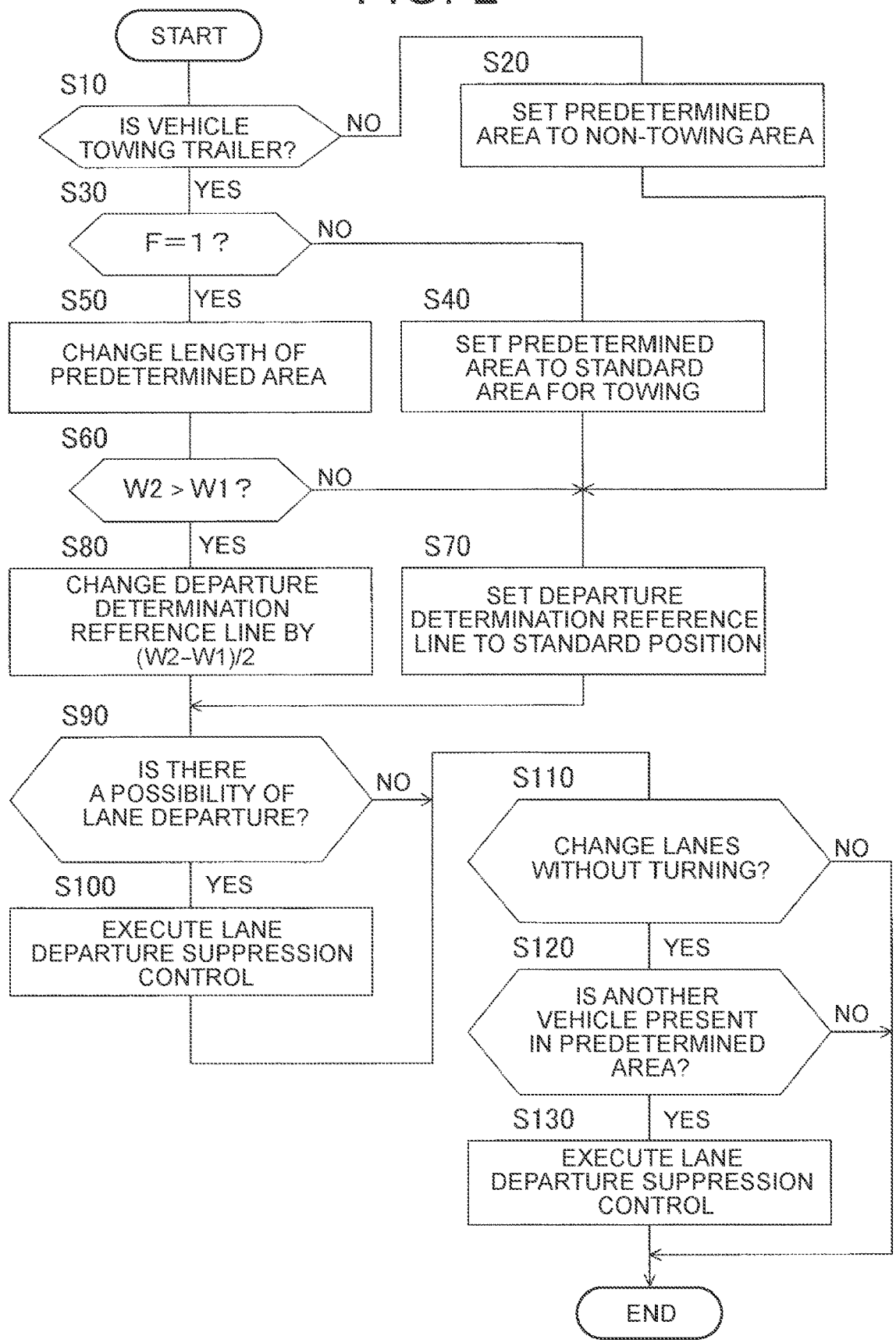
FIG. 2 is a flowchart showing a lane departure suppression control routine according to the embodiment.

As will be described in detail later, the ROM of the LDA/ECU 10 stores a lane departure suppression control program corresponding to the flowchart shown in FIG. 2, and the CPU executes the lane departure suppression control according to the program. Further, the ROM of the LDA/ECU 10 stores a trailer width and length calculation control program corresponding to the flowchart shown in FIG. 3, and the CPU executes the trailer width and length calculation control according to the program.

A camera sensor 12, a radar sensor 14, an LDA switch 16, a warning device 18, and a display device 19 are connected to the LDA/ECU 10. The camera sensor 12 and the radar sensor 14 function as an object information acquisition device 13 that acquires information on an object around the vehicle 60. The vehicle 60 is an autonomous driving vehicle, and lane departure suppression control may be executed when an autonomous driving mode is canceled.

The camera sensor 12 includes a plurality of camera devices, and each camera device includes a camera unit and a recognition unit that analyzes image data captured by the camera unit and recognizes an object such as road white lines and other vehicles. The camera sensor 12 supplies information about the recognized object to the LDA/ECU 10 at predetermined intervals. In the embodiment, the camera sensor 12 includes door mirror cameras that are installed in right and left door mirrors 62 of the vehicle 60 and capture an image of an area rearward of the vehicle (see FIG. 6).

Figure 4:
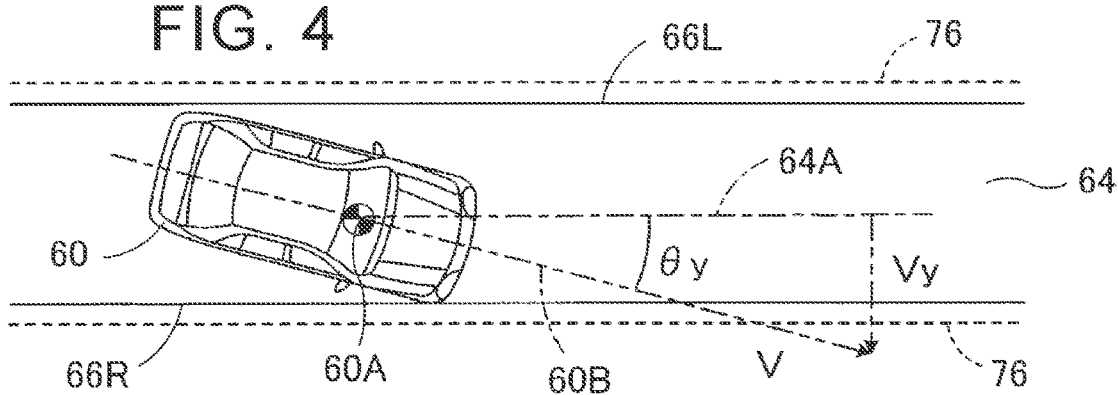
FIG. 4 is a diagram showing a situation in which a vehicle travels at an angle with respect to a longitudinal direction of a lane.

As shown in FIG. 4, the camera sensor 12 can recognize white lines 66L and 66R that are boundaries of a lane 64 (referred to as lane boundaries), and the camera sensor 12 can detect a positional relationship of the vehicle with respect to the lane 64, based on a relationship between a white line and a position of the vehicle 60. Here, the position of the vehicle 60 is a position of a center of gravity 60A of the vehicle, but it may be a center position in a plan view of the vehicle. A lateral position of the vehicle, which will be described later, represents the position of the center of gravity in a lane width direction, and a lateral speed of the vehicle represents a speed of the position of the center of gravity in the lane width direction. These are acquired based on the relative positional relationship between the white line detected by the camera sensor 12 and the vehicle.

The radar sensor 14 includes a plurality of radar devices, and each radar device includes a radar transmission-reception unit and a signal processing unit (not shown). The radar transmission-reception unit emits millimeter wave band radio waves (hereinafter referred to as "millimeter waves"), and receives millimeter waves (that is, reflected waves) reflected by three-dimensional objects present in a radiation range (for example, other vehicles and bicycles). The signal processing unit supplies, to the LDA/ECU 10, information indicating a relative distance between a host vehicle and the three-dimensional object, a relative speed of the host vehicle with respect to the three-dimensional object, a relative position (direction) of the three-dimensional object with respect to the host vehicle, and the like based on a phase difference between the emitted millimeter wave and the received reflected wave, an attenuation level of the reflected wave, the time from the emission of the millimeter wave to the reception of the reflected wave, and the like every time a predetermined time elapses. A light detection and ranging (LiDAR) may be used instead of the radar sensor 14.

The LDA switch 16 is operated by a driver and supplies a signal indicating whether the LDA switch 16 is on to the LDA/ECU 10. When the LDA switch 16 is on, it means that the lane departure suppression control is executed.

The warning device 18 is activated when the LDA/ECU 10 determines that there is a possibility that the vehicle 60 departs from the lane 64, and issues a warning as one of the lane departure suppression controls, that is, issues a warning that there is a possibility that the vehicle 60 departs from the lane. The warning device 18 may be any of a warning device that issues a visual warning such as a warning lamp, a warning device that emits an auditory warning such as a warning buzzer, and a warning device that issues a bodily warning such as vibration of a seat, and may be any combination thereof.

The display device 19 displays the situation of control by the LDA/ECU 10 and the like. The display device 19 may be, for example, a head-up display or a multi-information display on which meters and various types of information are displayed, or may be a display of a navigation device.

By controlling the EPS device 22, the EPS/ECU 20 can turn a turning wheel 24 as needed. Thus, the EPS/ECU 20 and the EPS device 22 constitute an automatic steering device 26 that automatically turns the turning wheel 24 as needed. When it is determined by the LDA/ECU 10 that there is a possibility that the vehicle 60 departs from the lane, the EPS/ECU 20 performs autonomous steer of the turning wheel 24 for suppressing the vehicle from departing from the lane, as another one of the lane departure suppression controls.

As shown in FIG. 1, a steering shaft 30 to which a steering wheel 28 operated by the driver is integrally connected is provided with a torque sensor 32 that detects a steering torque Ts. A signal indicating the steering torque Ts detected by the torque sensor 32 is input to the EPS/ECU 20. Based on the steering torque Ts and the vehicle speed V detected by the vehicle speed sensor (not shown), the EPS/ECU 20 controls the steering assist torque by controlling the EPS device 22 in a manner known in the technical field, and reduces a steering load of the driver. A signal indicating the steering torque Ts is input from the EPS/ECU 20 to the LDA/ECU 10 via the CAN 62.

A drive device 42 that accelerates the vehicle 60 by applying a driving force to drive wheels that are not shown in FIG. 1 is connected to the driving ECU 40. The driving ECU 40 normally controls the drive device such that a driving force generated by the drive device 42 changes in accordance with a driving operation by the driver, and controls the drive device 42 based on the command signal when the driving ECU 40 receives the command signal from the LDA/ECU 10. That drive device 42 may be any drive device known in the technical field.

A brake device 52 that decelerates the vehicle 60 by braking by applying a braking force to wheels that are not shown in FIG. 1 is connected to the braking ECU 50. The braking ECU 50 executes automatic braking in which the braking ECU 50 normally controls the brake device such that a braking force generated by the brake device 52 changes in accordance with a braking operation by the driver, and controls the brake device 52 based on a command signal when the braking ECU 50 receives the command signal from the LDA/ECU 10.

Lane Departure Suppression Control Routine

Next, a lane departure suppression control routine in the embodiment will be described with reference to the flowchart shown in FIG. 2. The lane departure suppression control according to the flowchart shown in FIG. 2 is repeatedly executed by the CPU of the LDA/ECU 10 at a predetermined control cycle when the LDA switch 16 is turned on. In the following description, the lane departure suppression control is simply referred to as the "control".

Figure 5A:
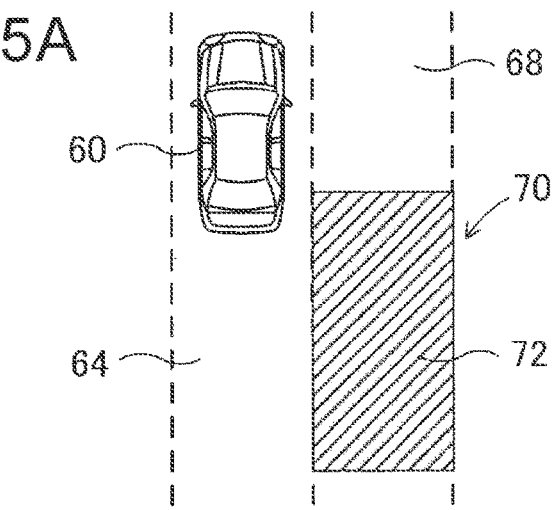
FIG. 5A is a diagram showing a predetermined area when the vehicle does not tow a trailer.
Figure 5B:
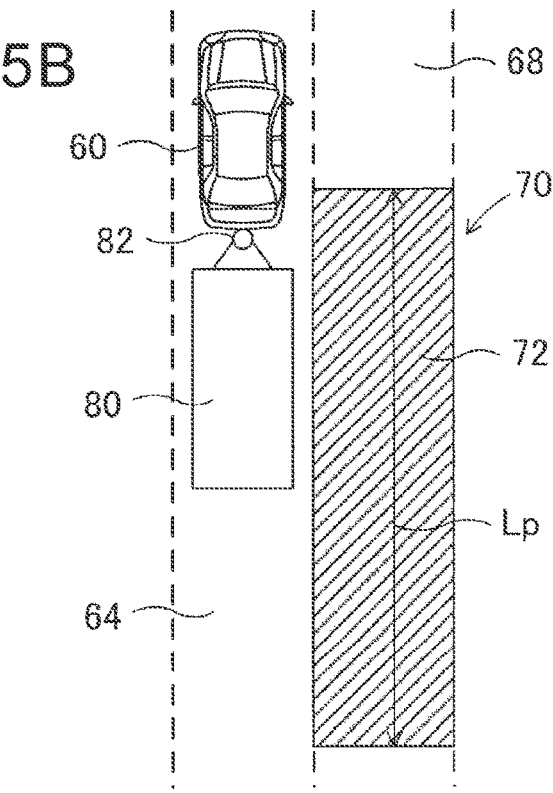
FIG. 5B is a diagram showing a predetermined area when the vehicle tows the trailer.
Figure 6:
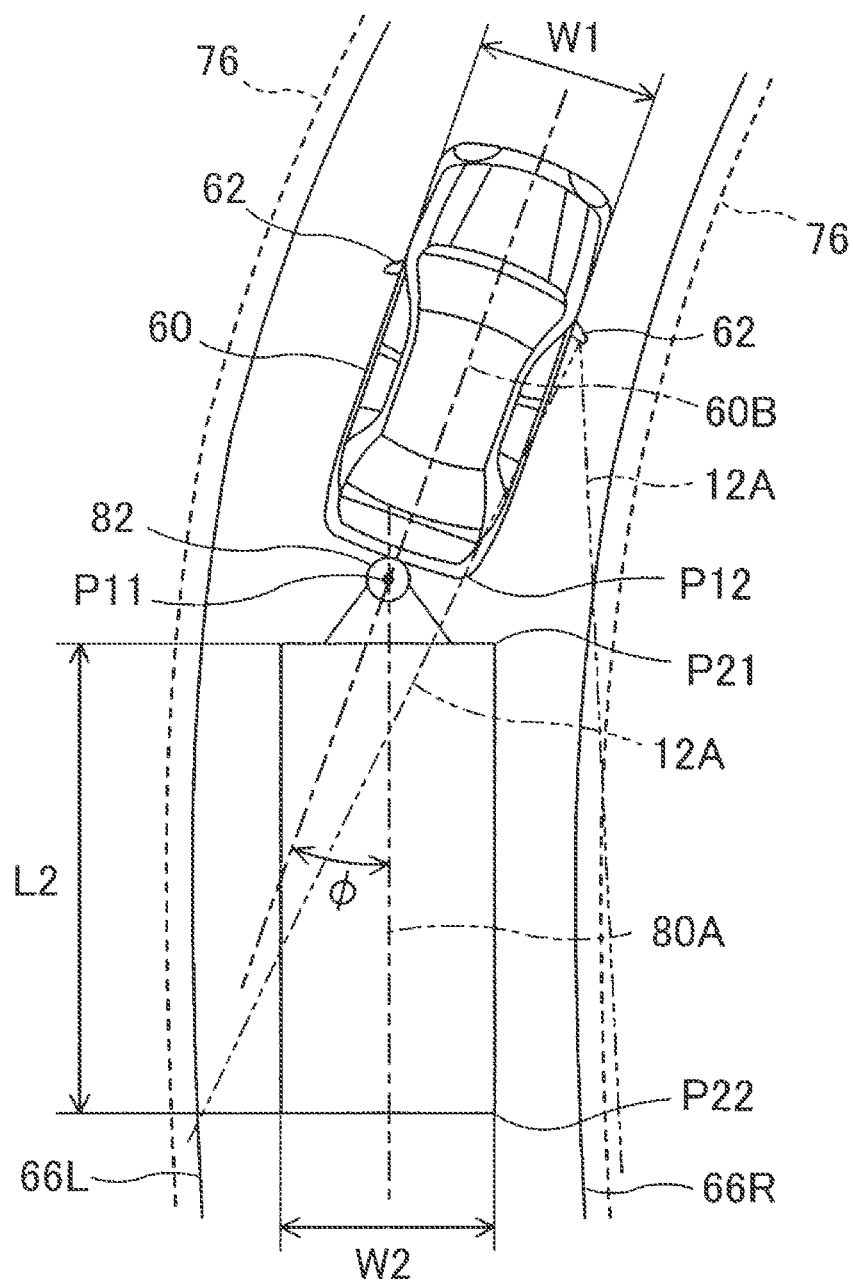
FIG. 6 is a diagram showing a situation in which the vehicle tows the trailer and travels around a curve.

First, in step S10, the CPU determines whether the vehicle 60 is towing the trailer 80, as shown in FIG. 5B. When the CPU makes the affirmative determination, the CPU advances the control to step S30, and when the CPU makes the negative determination, the CPU advances the control to step S20. In FIGS. 5B and 6, a reference sign 82 denotes a connecting device that connects the rear end portion of the vehicle 60 and the front end portion of the trailer 80.

In step S20, as shown in FIG. 5A, the CPU sets a predetermined area 70 that is set in a lane 68 adjacent to the lane 64 in which the vehicle 60 is traveling and that is positioned rearward of the vehicle 60 to a non-towing area 72. When there is an adjacent lane on both sides of the lane 64, a predetermined area is set for both adjacent lanes.

In step S30, the CPU determines whether a flag F is 1, that is, determines whether a width W2 and a length L2 (see FIG. 6) of the trailer 80 are known. The width W2 and the length L2 are calculated according to the flowchart shown in FIG. 3, as will be described later. When the CPU makes the affirmative determination, the CPU advances the control to step S50, and when the CPU makes the negative determination, the CPU advances the control to step S40. The flag F is initialized to 0 at the start of control, and then maintained to 0 or set to 1 in accordance with the flowchart shown in FIG. 3 as described later.

In step S40, the CPU sets a predetermined area 70 to a standard area 74 for towing, as shown in FIG. 5B. On the other hand, in step S50, the CPU changes a length Lp of the predetermined area 70 according to the length L2 of the trailer 80 such that the length Lp of the predetermined area 70 increases as the length L2 of the trailer 80 increases.

In step S60, the CPU determines whether the width W2 of the trailer 80 is greater than the width W1 of the vehicle 60. When the CPU makes the affirmative determination, the CPU advances the control to step S80, and when the CPU makes the negative determination, the CPU advances the control to step S70.

In step S70, the CPU sets a departure determination reference line 76 (see FIG. 4) to a preset standard position. On the other hand, in step S80, the CPU changes the position of the departure determination reference line such that the departure determination reference line approaches the center of the lane by (W2−W1)/2 with respect to the preset standard position, in other words, approaches the center of the lane as a difference between the two widths is large. In FIG. 4, the departure determination reference line 76 is positioned outside the white lines 66L and 66R that are the boundary lines of the lane 64, but the departure determination reference line 76 may be positioned inside or on the white lines 66L and 66R.

In step S90, the CPU determines whether there is a possibility that the vehicle departs from the lane in a manner known in the technical field, based on the relative positional relationship of the vehicle 60 with respect to the lane detected by the camera sensor 12. When the CPU makes the negative determination, the CPU advances the control to step S110, and when the CPU makes the affirmative determination, the CPU advances the control to step S100.

In this case, the determination as to whether there is a possibility that the vehicle 60 departs from the lane may be performed, for example, as follows. First, as shown in FIG. 4, an angle $\theta y$ formed by a traveling direction 60B of the vehicle with respect to a longitudinal direction 64A of the lane 64 is estimated based on the image information ahead of the vehicle 60. The angle $\theta y$ is a positive value when the traveling direction 60B of the vehicle 60 is on a right side with respect to the longitudinal direction 64A of the lane 64. A moving speed Vy of the vehicle 60 in a direction perpendicular to the longitudinal direction 64A of the lane 64 is estimated as $V \sin \theta y$ based on the angle $\theta y$ and the vehicle speed V.

Further, a distance Dy (not shown) in the lane width direction between the departure determination reference line 76 on the side where the vehicle 60 approaches and the center of gravity of the vehicle is estimated. Further, it may be determined that there is a possibility that the vehicle 60 departs from the lane when Dy−Vy$\Delta$t is equal to or less than a preset reference value Dyc (positive constant), with $\Delta$t serving as a preset time.

When a turn signal lever that is not shown in FIG. 1 is in an operating position or when the driver is performing a steering operation to change the lanes, it is determined that the driver intends to depart from the lane, and there is no possibility of the lane departure.

In step S100, the CPU executes the lane departure suppression control to reduce the possibility of the vehicle 60 departing from the lane. That is, the CPU issues a warning that the vehicle 60 may depart from the lane by activating the warning device 18, and displays on the display device 19 that the vehicle 60 may depart from the lane. Further, the CPU automatically turns the turning wheel 24 with the EPS device 22 such that the vehicle 60 does not depart from the lane by outputting a command signal of automatic steering to the EPS/ECU 20 when the possibility of the lane departure is further increased.

In step S110, the CPU determines whether the vehicle 60 and the trailer 80 are changing the lanes without turning. When the CPU makes the negative determination, the CPU temporarily ends the control, and when the CPU makes the affirmative determination, the CPU advances the control to step S120. When the vehicle 60 and the trailer 80 gradually move laterally with respect to the lane so as to cross the lane boundary without performing a steering operation in which the absolute value of the steering angle $\theta$ is equal to or greater than the reference value (positive constant) for steering determination, it may be determined that the vehicle 60 and the trailer 80 are changing the lanes without turning.

In step S120, the CPU determines whether another vehicle is present in the predetermined area 70. When the CPU makes the negative determination, the CPU temporarily ends the control, and when the CPU makes the affirmative determination, the CPU advances the control to step S130.

In step S130, the CPU executes the lane departure suppression control in the same manner as in step S100 such that the possibility for the vehicle 60 and the trailer 80 crossing the lane boundary is reduced. In this case, the display device 19 may display a message such as "It is dangerous to change the lanes because there is a following vehicle rearward."

Trailer Width and Length Calculation Control Routine

Figure 3:
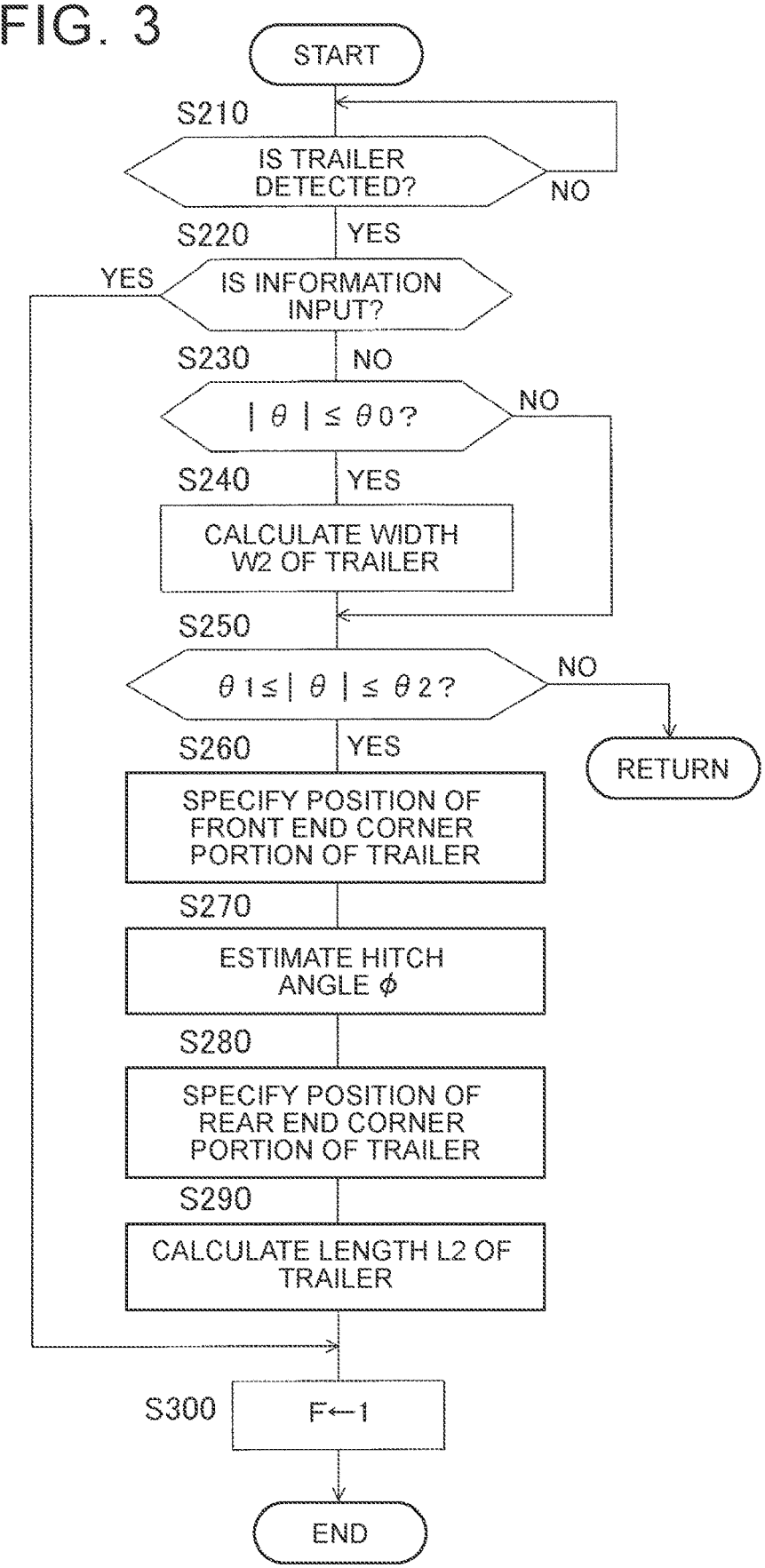
FIG. 3 is a flowchart showing a trailer width and length calculation control routine according to the embodiment.

Next, the trailer width and length calculation control routine will be described with reference to the flowchart shown in FIG. 3. The control according to the flowchart shown in FIG. 3 is repeatedly executed by the CPU of the LDA/ECU 10 at a predetermined control cycle when the LDA switch 16 is turned on and the flag F is 0. In the following description, the trailer width and length calculation control is simply referred to as the "calculation control".

First, in step S210, the CPU determines whether the trailer is detected. When the CPU makes the negative determination, the CPU temporarily ends the calculation control, and when the CPU makes the affirmative determination, the CPU advances the calculation control to step S220. For example, it may be determined that the trailer is detected when the image of the trailer 80 is captured by the camera sensor 12 that captures the image of the area rearward of the vehicle.

In step S220, the CPU determines whether information on the width W2 and the length L2 (see FIG. 6) of the trailer 80 is input by the driver. When the CPU makes the affirmative determination, the CPU advances the calculation control to step S300, and when the CPU makes the negative determination, the CPU advances the calculation control to step S230.

In step S230, the CPU determines whether the absolute value of the steering angle $\theta$ is equal to or less than the reference value $\theta 0$ (positive constant) for determination for traveling straight, that is, determines whether the vehicle 60 and the trailer 80 are substantially in a state of traveling straight. When the CPU makes the negative determination, the CPU advances the calculation control to step S250, and when the CPU makes the affirmative determination, the CPU advances the control to step S240.

In step S240, the CPU calculates the width W2 of the trailer 80. For example, the direction of the front end corner portion of the trailer with respect to the rear end corner portion of the vehicle 60 is specified based on the image of the front end corner portion of the trailer 80 captured by the camera sensor 12 that captures the image of the area rearward of the vehicle. Further, the distance from the rear end corner portion of the vehicle 60 to the front end corner portion of the trailer 80 is specified based on the detection result of the radar sensor 14 provided at the rear end corner portion of the vehicle 60. Further, the width W2 of the trailer is calculated based on the direction of the front end corner portion of the trailer with respect to the rear end corner portion of the vehicle 60 and the distance from the rear end corner portion of the vehicle 60 to the front end corner portion of the trailer.

In step S250, the CPU determines whether the absolute value of the steering angle $\theta$ is equal to or greater than the lower limit reference value $\theta 1$ (positive constant greater than $\theta 0$) for determination for traveling around the curve and equal to or lower than the upper limit reference value $\theta 2$ (positive constant greater than $\theta 1$) for determination for traveling around the curve. When the CPU makes the negative determination, the CPU temporarily ends the calculation control, and when the CPU makes the affirmative determination, the CPU advances the calculation control to step S260.

Instead of determining the absolute value of the steering angle θ, it may be determined whether the absolute value of the hitch angle φ is equal to or greater than the lower limit reference value φ1 (positive constant) and equal to or lower than the upper limit reference value φ2 (positive constant greater than φ1). The hitch angle φ is the angle between the centerline 60B of the vehicle 60 in the front-rear direction and the centerline 80A of the trailer 80 in the front-rear direction (see FIG. 6).

In step S260, as shown in FIG. 6, the CPU specifies a position P21 of the front end corner portion of the trailer 80 based on the detection result of the camera sensor 12 provided on the door mirror 62 of the vehicle 60 and the radar sensor 14 provided on and the rear end corner portion of the vehicle 60.

In step S270, the CPU estimates the hitch angle φ based on the steering angle θ. When a hitch angle sensor is provided, the hitch angle φ may be a value detected by the hitch angle sensor.

In step S280, as shown in FIG. 6, the CPU specifies a direction of the rear end corner portion of the trailer 80 with respect to the vehicle 60 based on the detection result of the camera sensor 12 provided on the door mirror 62 of the vehicle 60. Further, the CPU specifies a position P22 of the rear end corner portion of the trailer 80 based on the direction of the rear end corner portion of the trailer 80 with respect to the vehicle 60, the width W2 of the trailer 80, and the hitch angle tit. In FIG. 6, the chain double-dashed line indicated by a reference sign 12 indicates an example of the boundary of a range of which the image is captured by the camera sensor 12 installed on the door mirror 62.

In step S290, the CPU calculates the length L2 of the trailer based on a center P11 of the connecting device 82 that connects the front end portion of the trailer 80 to the rear end portion of the vehicle 60, a position P12 of the rear end corner portion of the vehicle 60, and the position P21 of the front end corner portion of the trailer 80 and the position P22 of the rear end corner portion of the trailer 80.

Steps S230 and S240 are omitted when the width W2 of the trailer 80 has already been calculated. Similarly, steps S250 to S290 are omitted when the length L2 of the trailer 80 has already been calculated.

In step S300, the CPU sets the flag F to 1, and terminates the calculation control.

As can be seen from the above description, according to the embodiment, when the vehicle 60 is towing the trailer 80 (step S10), the departure determination reference line is changed such that it is determined more easily that the vehicle may cross the departure determination reference line 76 than when the vehicle is not towing the trailer (step S80). Therefore, since it is determined more easily that the vehicle may cross the departure determination reference line, the lane departure suppression control (step S100) can be executed earlier when the vehicle is towing the trailer than when the vehicle is not towing the trailer. Therefore, it is possible to effectively reduce the possibility of the vehicle and the trailer departing from the lane.

Further, according to the embodiment, when the width W2 of the trailer 80 is greater than the width W1 of the vehicle 60 (step S60), the departure determination reference line 76 is changed so as to approach the center of the lane 64 as the difference between the two widths (W2−W1) is large. Therefore, it can be determined more easily that the vehicle and the trailer may cross the departure determination reference line as compared with a case when the departure determination reference line is not changed so as to approach the center of the lane as the difference between the two widths is large.

Specifically, in the embodiment, the departure determination reference line 76 is changed to approach the center of the lane by one-half of the difference between the two widths (W2−W1)/2. Therefore, the departure determination reference line 76 can be brought closer to the center of the lane appropriately according to the difference between the two widths.

Further, according to the embodiment, the lane departure suppression control (step S130) is executed such that the vehicle is suppressed from approaching the departure determination reference line when it is determined that another vehicle is present in the predetermined area 70 positioned rearward of the vehicle on a side of the departure determination reference line based on the information acquired by the object information acquisition device 13 in a situation where the vehicle 60 is towing the trailer 80 and is approaching the departure determination reference line 76.

Therefore, since it is possible to suppress the vehicle towing the trailer from moving in the direction approaching the departure determination reference line, it is possible to reduce the possibility of the vehicle and the trailer colliding with the other vehicle being present in the predetermined area as compared with a case where the vehicle is not suppressed from approaching the departure determination reference line.

Further, according to the embodiment, the length of the predetermined area is variably set based on the length of the trailer such that the length Lp of the predetermined area 70 increases as the length L2 of the trailer 80 increases (step S50). Therefore, as compared with a case where the length of the predetermined area is constant, even when the length of the trailer is long, it is possible to reduce the possibility of the vehicle and the trailer colliding with the other vehicle being present in the predetermined area.

Further, according to the embodiment, based on the information acquired by the object information acquisition device 13 when the vehicle 60 travels by towing the trailer 80, the positional relationship of the front end corner portion and the rear end corner portion of the trailer with respect to the vehicle is specified, and the width W2 and the length L2 of the trailer are calculated based on the positional relationship (steps S210 to S290). Therefore, information on the width and the length of the trailer can be acquired based on the information acquired by the object information acquisition device, and the necessity of acquiring the information on the width and the length of the trailer before the vehicle starts traveling by towing the trailer can be eliminated.

In particular, in the embodiment, the width W2 of the trailer is calculated based on the information acquired by the object information acquisition device 13 when the vehicle 60 tows the trailer 80 and substantially travels straight (steps S210 to S240). Therefore, information on the hitch angle φ is unnecessary, so that the width W2 of the trailer can be calculated more easily and accurately as compared with a case when the width W2 of the trailer is calculated based on the information acquired by the object information acquisition device 13 when the vehicle 60 tows the trailer 80 and travels around the curve.

The present disclosure has been described in detail above with respect to specific embodiments. However, it is obvious to those skilled in the art that the present disclosure is not limited to the above-described embodiments, and various other embodiments are possible within the scope of the present disclosure.

For example, in the above-described embodiment, in step S80, the position of the departure determination reference line is changed so as to approach the center of the lane by (W2−W1)/2 with respect to the preset standard position. However, a process equivalent to the process in which the position of the departure determination reference line is changed may be performed such that the departure determination reference line approaches the center of the lane as the difference between the width W2 of the trailer 80 and the width W1 of the vehicle 60 (W2−W1) is large by reducing the reference value Dyc in the determination in step S90 by, for example, (W2−W1)/2.

Further, in the above-described embodiment, in steps S110 to S130, when the vehicle 60 and the trailer 80 change the lanes without turning to the other vehicle side in a situation where the other vehicle is present rearward of them, the lane departure suppression control is executed. However, the lane departure suppression control when the vehicle and the trailer change the lanes without turning, that is, steps S40, S50 and steps S110 to S130 may be omitted. In that case, steps S250 to S290 of the flowchart shown in FIG. 3 may also be omitted.

Further, in the above-described embodiment, the width W2 and the length L2 of the trailer 80 are calculated based on the detection results of the camera sensor 12 that captures the image of the area rearward of the vehicle and that is installed on the door mirror 62, and the radar sensor 14 provided on the rear end corner portion of the vehicle 60. However, the width W2 and the length L2 of the trailer 80 may be calculated in any manner known in the technical field. For example, the position P21 of the front end corner portion and the position P22 of the rear end corner portion of the trailer 80 may be specified based on the detection results of a plurality of camera sensors provided on the vehicle 60.

In the embodiment, the width W2 of the trailer is calculated based on the information acquired by the object information acquisition device 13 when the vehicle 60 tows the trailer 80 and substantially travels straight. However, the width W2 of the trailer may be calculated based on the hitch angle φ and the information acquired by the object information acquisition device 13 when the vehicle 60 tows the trailer 80 and travels around the curve.

Further, in the above embodiment, in steps S60 to S80, when the vehicle 60 is towing the trailer 80 and the width W2 of the trailer 80 is greater than the width W1 of the vehicle 60, the position of the departure determination reference line is changed so as to approach the center of the lane by (W2−W1)/2. However, steps S60 to S80 may be omitted.

Further, in the above-described embodiment, as the lane departure suppression control, a warning is issued by the operation of the warning device 18, the situation of the control is displayed on the display device 19, and the automatic steering by the EPS device 22 is performed. However, at least one of the issuance of the warning, the display by the display device 19, and the automatic steering may be omitted.

What is claimed is:

1. A lane departure suppression device comprising one or more processors configured to:
    acquire information on an object around a vehicle; and
    execute, in a case where determination is made that there is a possibility that the vehicle crosses a departure determination reference line based on the information, lane departure suppression control such that the possibility is reduced, the departure determination reference line being set to a preset standard position,
    wherein, in a case where the vehicle is towing a trailer, the one or more processors is further configured to:
        determine whether a width of a trailer towed by the vehicle is greater than a width of the vehicle; and
        change, in a case where a width of the trailer is greater than a width of the vehicle, the departure determination reference line such that the departure determination reference line approaches a center of a lane by a distance D, the distance D being calculated using Expression 1 below:

$$D=(W1-W2)/2,$$

where W1 is the width of a trailer towed by the vehicle, and W2 is the width of the vehicle.

2. The lane departure suppression device according to claim 1, wherein the one or more processors are further configured to execute the lane departure suppression control such that the vehicle is suppressed from approaching the departure determination reference line when determination is made that another vehicle is present in a predetermined area positioned rearward of the vehicle on a side of the departure determination reference line based on the information acquired by the one or more processors in a situation where the vehicle is towing the trailer and is approaching the departure determination reference line.

3. The lane departure suppression device according to claim 2, wherein the one or more processors are further configured to variably set a length of the predetermined area based on a length of the trailer such that the length of the predetermined area increases as the length of the trailer increases.

4. The lane departure suppression device according to claim 3, wherein the one or more processors are further configured to specify a positional relationship of a front end corner portion and a rear end corner portion of the trailer with respect to the vehicle based on the information acquired by the one or more processors when the vehicle travels by towing the trailer, and calculate a width and the length of the trailer based on the positional relationship.

5. The lane departure suppression device according to claim 1, wherein the one or more processors are further configured to:
    determine whether another vehicle is present in a predetermined area based on the information in a case where the vehicle is towing the trailer and the vehicle is approaching the departure determination reference line; and
    execute the lane departure suppression control such that the vehicle is suppressed from approaching the departure determination reference line in a case where determination is made that another vehicle is present in a predetermined area, the predetermined area being positioned rearward of the vehicle on an adjacent lane on a side of the departure determination reference line and being set such that a length of the predetermined area in a vehicle's traveling direction increases as a length of the trailer increases.

* * * * *